(12) United States Patent
Eller et al.

(10) Patent No.: US 7,313,898 B1
(45) Date of Patent: Jan. 1, 2008

(54) CONTAINER CARRYING SYSTEM AND METHOD FOR USE IN AN AUTOMATED FILLING PROCESS

(75) Inventors: Charles E. Eller, Lake St. Louis, MO (US); Thomas C. Pegg, West Olive, MI (US)

(73) Assignee: Express Scripts, Inc., St. Louis, MO (US)

( * ) Notice: Subject to any disclaimer, the term of this patent is extended or adjusted under 35 U.S.C. 154(b) by 0 days.

(21) Appl. No.: 10/652,923

(22) Filed: Aug. 29, 2003

(51) Int. Cl.
B65B 5/08 (2006.01)
(52) U.S. Cl. .......................... 53/251; 53/151; 53/250; 53/473; 53/474; 108/54.1; 108/153.1
(58) Field of Classification Search ............... 206/146; 53/473, 147, 151, 250, 251, 142, 474; 108/54.1, 108/153.1
See application file for complete search history.

(56) References Cited

U.S. PATENT DOCUMENTS

| | | | |
|---|---|---|---|
| 4,664,289 A | 5/1987 | Shimizu et al. ................ 221/2 |
| 4,672,553 A | 6/1987 | Goldberg .................... 364/478 |
| 4,847,764 A | 7/1989 | Halvorson ............. 364/413.02 |
| 4,918,604 A | 4/1990 | Baum .................... 364/413.01 |
| 4,972,657 A | 11/1990 | McKee ........................ 53/411 |
| 5,080,023 A * | 1/1992 | Miura et al. ............... 108/55.3 |
| 5,097,652 A | 3/1992 | Inamura et al. ............... 53/493 |
| 5,193,700 A * | 3/1993 | Lyman et al. ................ 220/1.5 |
| 5,197,261 A | 3/1993 | Hartness et al. .............. 53/534 |
| 5,208,762 A | 5/1993 | Charhut et al. ............. 364/478 |
| 5,271,490 A * | 12/1993 | Sticht ........................ 198/349 |
| 5,337,919 A | 8/1994 | Spaulding et al. ............. 221/2 |
| 5,348,061 A | 9/1994 | Riley et al. ................. 141/104 |
| 5,365,722 A | 11/1994 | Edwards et al. ............. 53/502 |
| 5,463,839 A | 11/1995 | Stange et al. ................. 53/54 |
| 5,463,840 A | 11/1995 | Bailer ......................... 53/117 |
| 5,522,512 A | 6/1996 | Archer et al. .............. 209/580 |
| 5,566,695 A * | 10/1996 | Levey et al. .................. 134/83 |
| 5,597,995 A | 1/1997 | Williams et al. ............ 235/375 |
| 5,638,657 A | 6/1997 | Archer et al. ................. 53/253 |
| 5,660,305 A | 8/1997 | Lasher et al. ............... 221/206 |
| 5,667,096 A | 9/1997 | Wu .............................. 221/6 |
| 5,709,063 A | 1/1998 | Yuyama et al. ............... 53/154 |
| 5,713,180 A | 2/1998 | Lewis .......................... 53/253 |
| 5,713,485 A | 2/1998 | Liff et al. ....................... 221/2 |
| 5,720,154 A | 2/1998 | Lasher et al. ................. 53/411 |
| 5,752,368 A | 5/1998 | Tobe ........................... 53/501 |
| 5,762,116 A | 6/1998 | Moore ........................ 141/145 |

(Continued)

OTHER PUBLICATIONS

Automated Prescription Systems, Inc. The Baker Autoscript II System, undated.

(Continued)

Primary Examiner—Christopher Harmon
(74) Attorney, Agent, or Firm—Bryan Cave, LLP

(57) ABSTRACT

In a container carrier system and method for use in an automated process for filling containers of multiple sizes, pucks of various sizes are inserted into compartments of container pallets to allow containers of different sizes to be held in the compartments. A puck configuration subsystem can be used to configure each pallet to hold a desired combination of containers of two or more container sizes by inserting and removing pucks from the compartments. A pallet conveyor can be used to transport configured pallets from the puck configuration subsystem to the filling process and return empty pallets to the puck configuration subsystem for reconfiguration.

5 Claims, 14 Drawing Sheets

U.S. PATENT DOCUMENTS

| | | | |
|---|---|---|---|
| 5,765,606 A | 6/1998 | Takemasa et al. | 141/104 |
| 5,771,657 A | 6/1998 | Lasher et al. | 53/55 |
| 5,787,678 A | 8/1998 | Koike et al. | 53/154 |
| 5,797,515 A | 8/1998 | Liff et al. | 221/2 |
| 5,810,061 A | 9/1998 | Yuyama | 141/129 |
| 5,812,410 A | 9/1998 | Lion et al. | 364/479 |
| 5,829,231 A | 11/1998 | Harding et al. | 53/493 |
| 5,839,257 A | 11/1998 | Soderstrom et al. | 53/411 |
| 5,852,911 A | 12/1998 | Yuyama et al. | 53/168 |
| 5,875,610 A | 3/1999 | Yuyama et al. | 53/75 |
| 5,876,555 A | 3/1999 | Hellsund et al. | 156/540 |
| 5,883,370 A | 3/1999 | Walker et al. | 235/375 |
| 5,884,806 A | 3/1999 | Boyer et al. | 221/75 |
| 5,907,493 A | 5/1999 | Boyer et al. | 364/479.01 |
| 5,946,883 A | 9/1999 | Yuyama et al. | 53/154 |
| 5,963,453 A | 10/1999 | East | 364/479.14 |
| 5,988,858 A | 11/1999 | Yuyama et al. | 364/478.18 |
| 6,006,946 A | 12/1999 | Williams et al. | 221/9 |
| 6,014,631 A | 1/2000 | Teagarden et al. | 705/3 |
| 6,035,905 A | 3/2000 | Griffin | 141/181 |
| 6,036,812 A | 3/2000 | Williams et al. | 156/277 |
| 6,098,057 A | 8/2000 | Dlugos | 705/407 |
| 6,119,737 A | 9/2000 | Yuyama et al. | 141/104 |
| 6,145,700 A | 11/2000 | Takahashi et al. | 221/133 |
| 6,155,485 A | 12/2000 | Coughlin et al. | 235/383 |
| 6,167,679 B1 | 1/2001 | Horton-Steidle et al. | 53/411 |
| 6,170,230 B1 | 1/2001 | Chudy et al. | 53/168 |
| 6,176,392 B1 | 1/2001 | Williams et al. | 221/109 |
| 6,181,982 B1 | 1/2001 | Yuyama et al. | 700/236 |
| 6,185,479 B1 | 2/2001 | Cirrone | 700/216 |
| 6,202,385 B1 | 3/2001 | Kim | 53/154 |
| 6,202,923 B1 | 3/2001 | Boyer et al. | 235/375 |
| 6,208,911 B1 | 3/2001 | Yamaoka et al. | 700/242 |
| 6,216,418 B1 | 4/2001 | Kim | 53/131.5 |
| 6,219,587 B1 | 4/2001 | Ahlin et al. | 700/233 |
| 6,256,967 B1 | 7/2001 | Hebron et al. | 53/501 |
| 6,308,494 B1 | 10/2001 | Yuyama et al. | 53/154 |

OTHER PUBLICATIONS

Automated Prescription Systems, Inc. A Special Presentation of AUTOSCRIPT II, undated.

Automated Prescription Systems, Inc. What's New Baker Autoscript II, Jul. 1991.

Automated Prescription Systems, Inc. Automated Prescription Services—AUTOSCRIPT II (Video), undated.

L. Michael Posey Drug Distribution: Options for Enhancing Efficiency, Nov. 1996.

Bosch Automation Products The TS*plus* Modular Conveyors for Flexible Manufacturing—Version 1.0, 2000.

* cited by examiner

CONTAINER CARRYING SYSTEM AND METHOD FOR USE IN AN AUTOMATED FILLING PROCESS

FIELD OF THE INVENTION

This invention generally relates to automated dispensing systems. More specifically, this invention is directed to a container carrying system and method for use in a container filling process, such as an automated prescription dispensing system.

BACKGROUND OF THE INVENTION

Various systems have been developed to automatically fill large quantities of prescription bottles for use primarily in mail order pharmacies. For example, U.S. Pat. No. 5,208,762 to Charhut describes an automated prescription bottle filling system sold by Automed Technologies, Inc., under the trademark OPTIFILL®. The system automatically fills, labels, caps, and sorts prescription bottles in accordance with prescription orders stored in a database.

Some automated prescription dispensing systems are carrier-based. Such carrier-based systems have been well-known and widely used in the prescription dispensing industry for over a decade. An example of a carrier-based system is the AUTOSCRIPT II™ system originally manufactured by Automated Prescription Systems (now McKesson Automated Prescription Systems) in the early 1990s. Another example of a carrier-based system is illustrated in Lasher et al. U.S. Pat. No. 5,771,657. In both of these systems, carriers loaded with empty prescription bottles are transported to dispensers containing various prescription drugs, where each bottle is filled with the prescription corresponding to the prescription information on the bottle label.

A significant limitation of both carrier and non-carrier based dispensing systems is their lack of ability to effectively accommodate prescription bottles of multiple sizes. Charhut describes a non-carrier system that uses a conveyor lane to pass a row of bottles under an automated filler. As illustrated in FIG. 2 of Charhut, the system has three conveyor lanes. Bottles of three different sizes are filled by assigning each bottle size to a conveyor lane. This approach has a number of shortcomings. First, the system requires a separate conveyor lane to handle each different bottle size. Second, because a single customer order will often comprise several prescriptions having bottles of various sizes, the system requires a sorting conveyor to sort the bottles coming off the three conveyor lanes into customer orders. This sorting subsystem reduces the efficiency and speed of the system and introduces an additional step into the process, with an accompanying opportunity for system malfunction or error.

In Lasher, bottles of various sizes are loaded onto assigned locations on a carrier for filling using a conveyor-system like that described in Charhut. Lasher describes a bottle carrier having bottle wells arranged in a 4×6 array. As shown in FIGS. 4A and 4B of Lasher, the wells are sized to accommodate two standard bottle sizes. The leading row consists of four wells sized to accommodate four large bottles and the remaining five rows consist of four wells sized to accommodate twenty small bottles. According to Lasher, this breakdown is a close approximation to the anticipated requirements for large and small bottles. However, in practice, the actual combination of bottles of each size needed for a given set of prescription orders varies widely and is difficult to predict. Thus, in addition to other limitations of the system disclosed in Lasher, the carriers often will not have the optimal number of wells of each size actually needed. Consequently, bottles must often be placed in a queue to wait for a well that fits or carriers with empty wells must be processed through pill dispensers. These shortcomings can significantly reduce the output rate of the dispensing system. Moreover, customer orders must often be split over multiple carriers if the various sized bottles of an order cannot be accommodated in the available wells of a single carrier. Because the bottles of a single customer order may be split over multiple carriers, the system requires a carrier consolidating system, comprised of a turntable and other complex mechanisms, so that all of the bottles of an order can be removed from multiple carriers for packaging and shipping. The carrier consolidation system is shown in FIG. 7 of Lasher. Like the sorting system in Charhut, this carrier consolidation system reduces the efficiency and speed of the system and introduces an additional step into the process, with an accompanying opportunity for error.

Thus, there is a strong need for a system that allows multiple sized bottles to be loaded onto a conveyor system for filling, which avoids the need for sorting or consolidating carriers after filling. The system of the present invention provides these and other advantages.

SUMMARY OF THE INVENTION

The invention provides a container carrier system for use in an automated process for filling containers of multiple sizes. The carrier system includes one or more pallets, each pallet comprising a structure defining a plurality of compartments for holding containers. Each compartment is sized to hold a container size. The system also includes a plurality of pucks of one or more sizes. The pucks are structured to be temporarily loaded onto the pallet to adapt the compartments to hold one or more additional container sizes. Each pallet can be repetitively configured to hold various desired combinations of containers of different sizes by loading and unloading pucks from the pallet.

The system also preferably includes a puck configuration subsystem for repetitively configuring each pallet to hold various desired combinations of containers of the first container size and second container size by loading and unloading pucks. A pallet conveyor transports the configured pallet from the puck configuration subsystem to the filling process and returns the pallet from the filling process to the puck configuration subsystem for reconfiguration.

The puck configuration subsystem can include a puck unloading station for unloading pucks from the pallet and one or more puck loading stations for loading pucks on the pallet. The puck unloading station can include a puck picker comprising one or more grippers for selectively gripping and releasing the pucks, a puck accumulator belt for accumulating pucks, and a plurality of linear actuators for positioning the puck picker such that the puck picker can remove a selected number of pucks from the pallet and release the selected pucks onto the accumulator belt. Each puck loading station can include a puck picker comprising one or more grippers for selectively gripping and releasing pucks, a puck accumulator belt for accumulating pucks, and a plurality of linear actuators for positioning the puck picker such that the puck picker can remove a selected number of pucks from the accumulator belt and load the selected pucks on the pallet.

The invention also includes a method for automatically filling prescription orders, where at least a portion of the orders comprise prescription containers of multiple sizes. A plurality of pallets is provided. Each pallet has a number of compartments for holding containers of a given size. The prescription orders are organized into groups. Each group comprises a total number of prescription containers equal to or less than the number of compartments. The number of containers of each size in each group is determined. A plurality of pucks is provided. Each puck is structured to adapt a compartment to hold a container of one or more additional sizes. The group of orders is assigned to a pallet. The compartments of the pallet are then loaded with a number of pucks equal to the number of containers of the additional size in the group assigned to the pallet. The compartments of the pallet are then loaded with containers of each size. Containers of the first size are inserted into compartments without a puck and containers of the additional sizes are inserted into compartments with pucks corresponding to the size of the container. The pallets are then transported through an automated dispensing system to fill the containers.

BRIEF DESCRIPTION OF THE DRAWINGS

These and other features, aspects and advantages of the invention will become more fully apparent from the following detailed description, appended claims, and accompanying drawings where:

Figure 1:
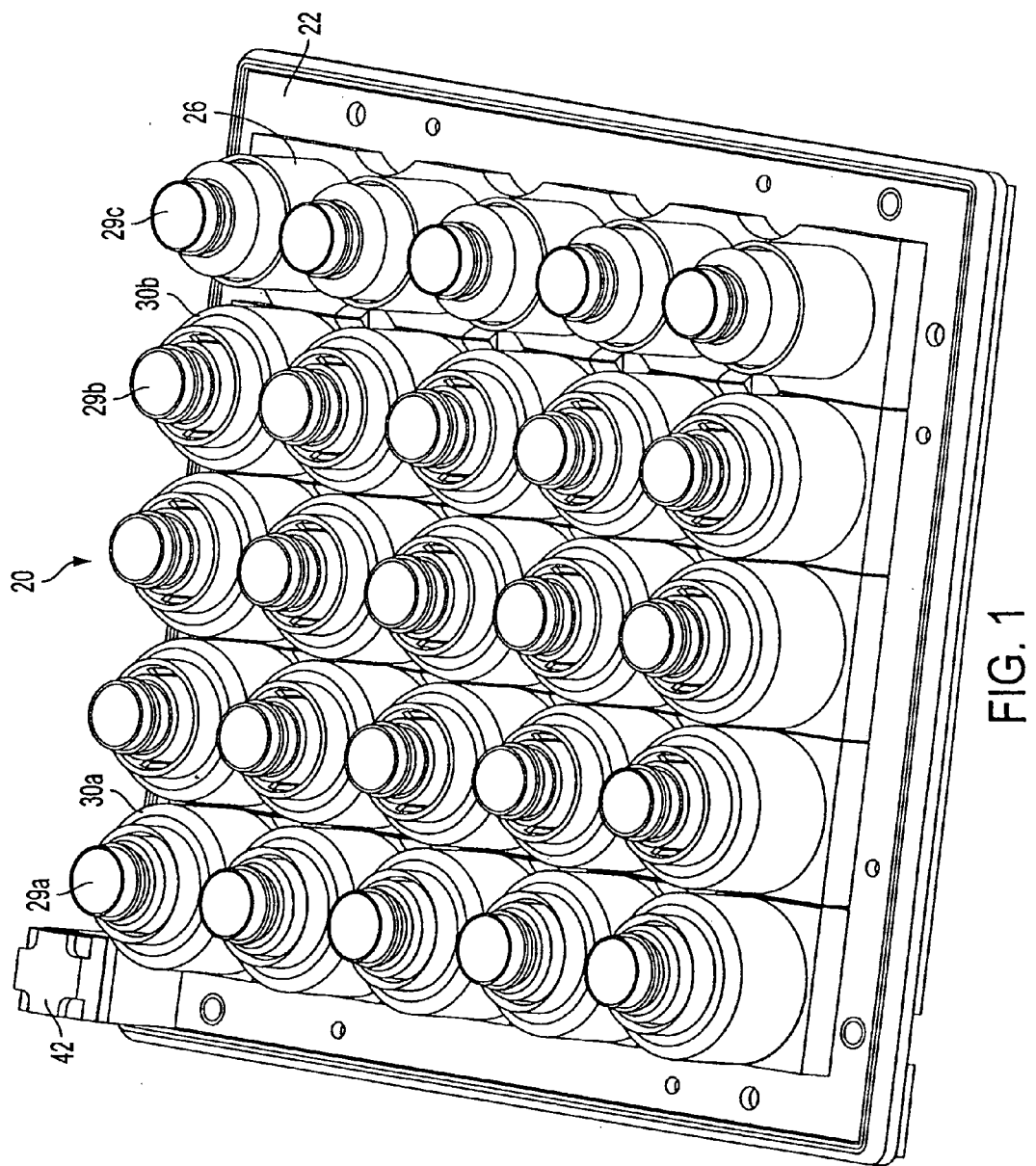
FIG. 1 is a perspective view of a pallet comprising a structure defining a plurality of compartments for holding containers and pucks.

For clarity, the drawing figures illustrate the general configuration of a preferred embodiment of the system and method. Descriptions and details of well-known features and alternative embodiments of the invention are omitted to avoid unnecessarily obscuring the invention and because people of ordinary skill in the art will appreciate and understand the invention is capable of and teaches various alternative embodiments. The drawings are provided for illustrative purposes only and should not be used to unduly limit the scope of the invention.

DESCRIPTION

The invention provides a container carrier system and method for use in an automated process for filling containers of multiple sizes. The carrier system and method described herein allow various combinations of containers of multiple sizes to be loaded onto a carrier for filling in a conveyor-type automated filing process. The system can be used in any automated processes for filling bottles or other containers of multiple sizes. The system is particularly adapted for use in an automated prescription dispensing process for filling orders comprising prescription bottles of multiple sizes, but may be used for other types of products.

Carrier Pallets

Figure 2:
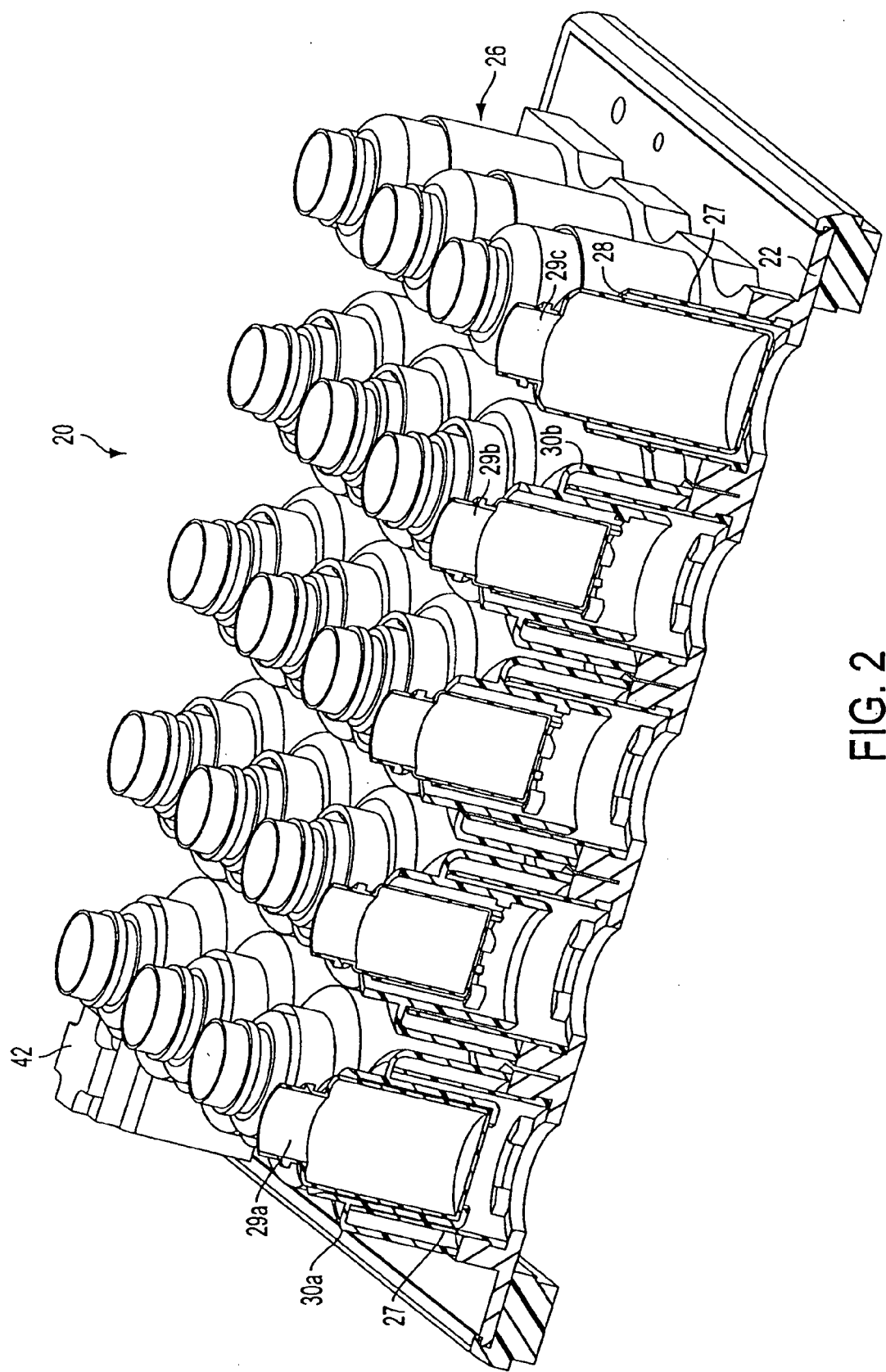
FIG. 2 is a sectional view of the pallet of FIG. 1.

With reference to the embodiment shown in FIGS. 1 and 2, the carrier system includes a pallet 20 for holding containers. The pallet 20 has a base 22 and a structure defining a plurality of compartments 26 adjoining the base. The compartments can be constructed from tooling affixed to the base or can be integrally formed with the base. The illustrated embodiment of the invention is adapted for use in an automated prescription dispensing process. In this preferred embodiment, the pallet is square and has twenty-five compartments arranged in rows and columns. Pallets can have various other shapes and numbers of compartments. Each compartment 26 is sized to securely hold a particular size of container. The compartments can be of any of a variety of geometrical shapes, and are preferably of the same shape as the containers being filled to securely hold the containers during the filling process. In the illustrated embodiment, the compartments 26 are of a tubular, cuplike shape for holding cylindrical prescription bottles of a 200 cc size 29c.

Each compartment 26 has tubular side walls 27 defining an opening 28 for receiving either a bottle or a puck. As used herein, the term "puck" refers to any device that is loaded on a pallet to reduce or enlarge the size of a compartment opening 28. Each puck is structured to be removeably loaded onto the pallet to adapt a compartment to hold a particular container size. The illustrated embodiment includes two puck sizes, one size of puck 30a is sized to hold a 120 cc bottle 29a and the other size of puck 30b is sized to hold a 75 cc bottle 29b. The pucks are loaded onto the pallet by inserting each puck into a compartment 26. As used herein the terms "loading" and "inserting" refer interchangeably to positioning the puck in and/or over a compartment so as to reduce or enlarge the opening.

Pucks

Figure 3:
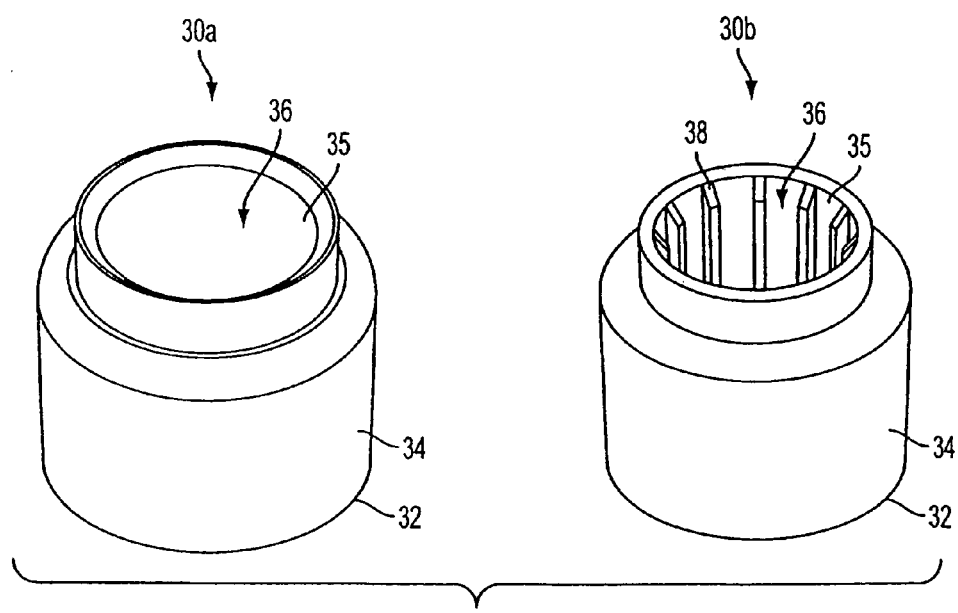
FIG. 3 is a perspective top view of two pucks.
Figure 4:
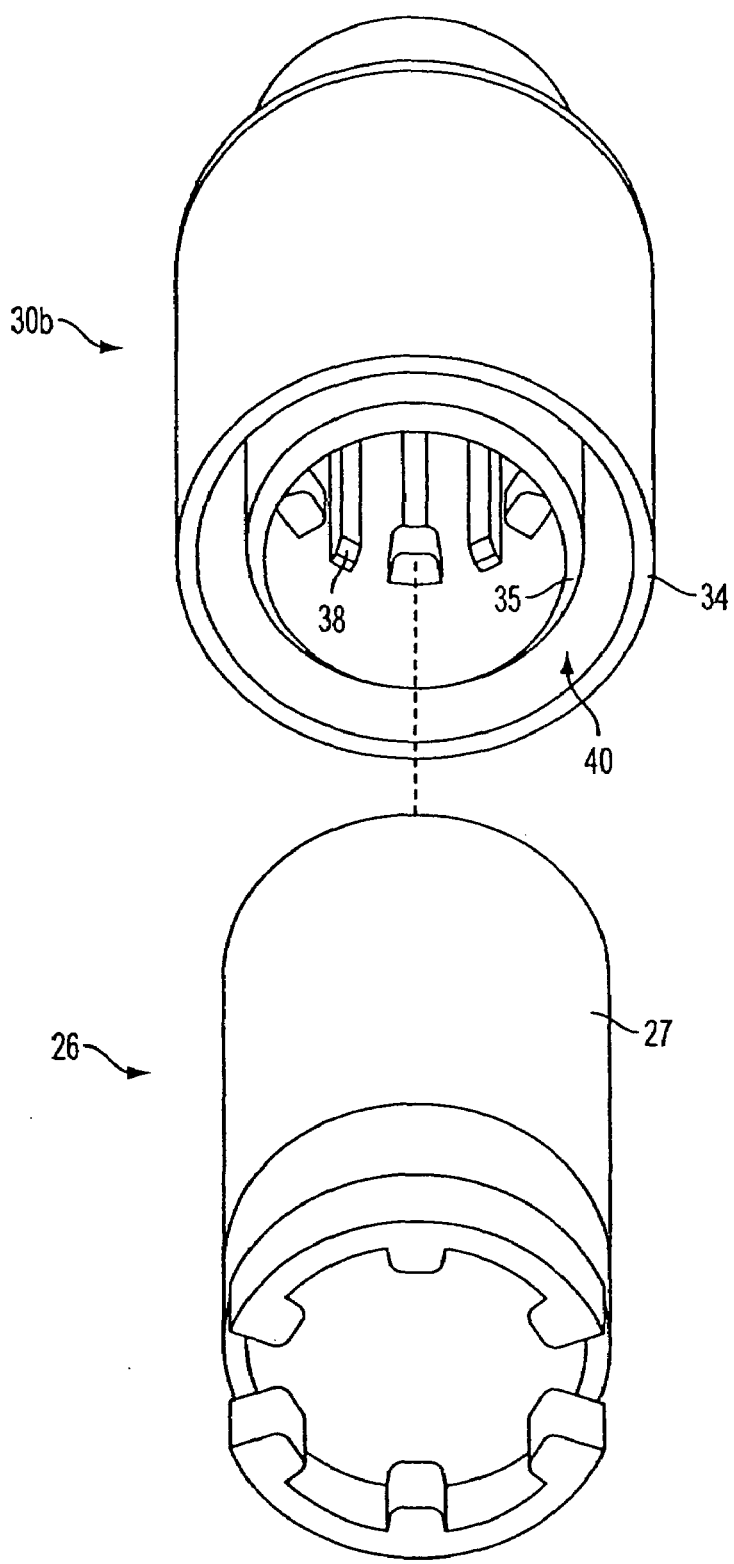
FIG. 4 is an exploded bottom view of a puck and a container.

FIGS. 3 and 4 illustrate examples of pucks for use with a carrier system for an automated prescription dispensing system. Each puck 30a and 30b is preferably of a cuplike shape having a bottom 32, tubular outer side walls 34 and tubular inner side walls 35. Inner side walls 35 define an opening 36 for receiving a container. In the illustrated embodiment, the opening 36 of the 120 cc puck 30a is sized to receive and securely hold a 120 cc prescription bottle 29a. The opening 36 of 75 cc puck 30b preferably includes a plurality of ribs 38 for reducing the circumference of the opening 36 to receive and securely hold a 75 cc bottle. The outer side walls 34 and inner side walls 35 define a tubular slot 40 in the bottom 32 of the puck for receiving the tubular side walls 27 of a compartment 26. In the illustrated embodiment, pucks are loaded onto the pallet by placing pucks 30a or 30b over compartments 26 such that the tubular side walls 27 of each compartment are received within the tubular slot 40 of each puck.

Pucks can be loaded in various combinations of sizes to achieve the desired configuration of the pallet. For example, the pallet illustrated in FIG. 1 is configured to hold five 120 cc bottles 29*a*, fifteen 75 cc bottles 29*b* and five 200 cc bottles 29*c*. Various other combinations can be made by adding or removing pucks. The pallet preferably includes a tag 42, such as a radio frequency (RF) tag, for electronically recording the puck configuration of each pallet. The system also preferably includes a tag reader and writer (not shown) for recording and retrieving information stored on the tag.

Puck Configuration Subsystem

Figure 5:
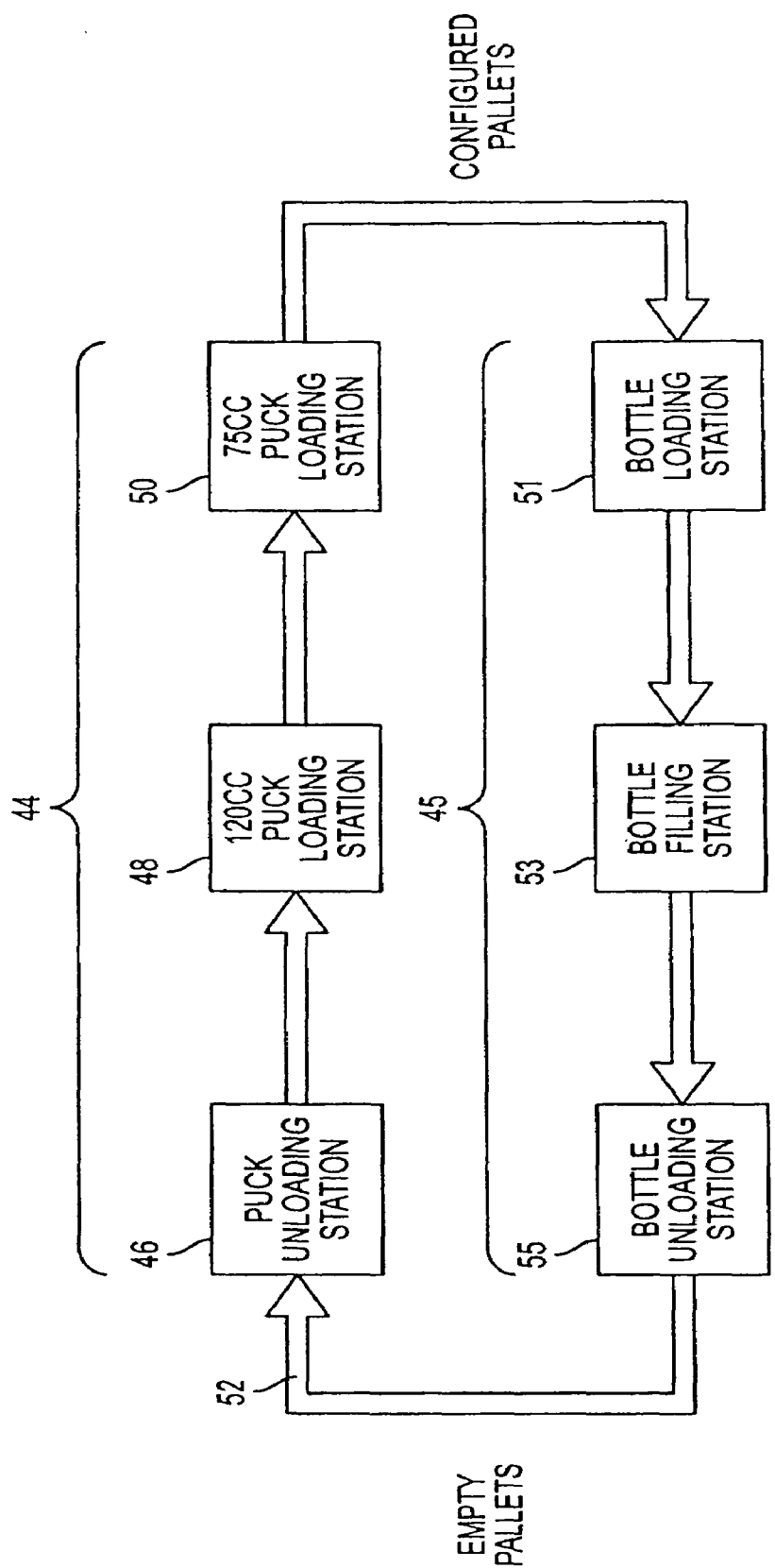
FIG. 5 schematically illustrates an automated prescription dispensing system incorporating a carrier system for filling containers of a plurality of sizes.

With reference to FIG. 5, the system preferably includes puck configuration subsystem 44 for loading and unloading pucks from pallets. The puck configuration subsystem 44 preferably includes a puck unloading station 46 and one or more puck loading stations, such as 48 and 50. Puck loading station 48 loads pucks for 120 cc bottles and puck loading station 50 loads pucks for 75 cc bottles. Alternatively, a single machine can be used to load and/or unload the one or more puck sizes. A conveyor system 52 can be used to transport the pallets through the puck configuration subsystem 44 and filling process 45, where prescription bottles of three different sizes are loaded into the pallets and filled using conventional automated prescription dispensing equipment like the OPTIFILL® system illustrated in Charhut, U.S. Pat. No. 5,208,762. The filling process 45 typically comprises a bottle loading station 51, a bottle filling station 53, and a bottle unloading station 55. After the filled bottles are unloaded from the pallets, the pallets can be returned to the configuration subsystem 44 for reconfiguration.

Figure 6:
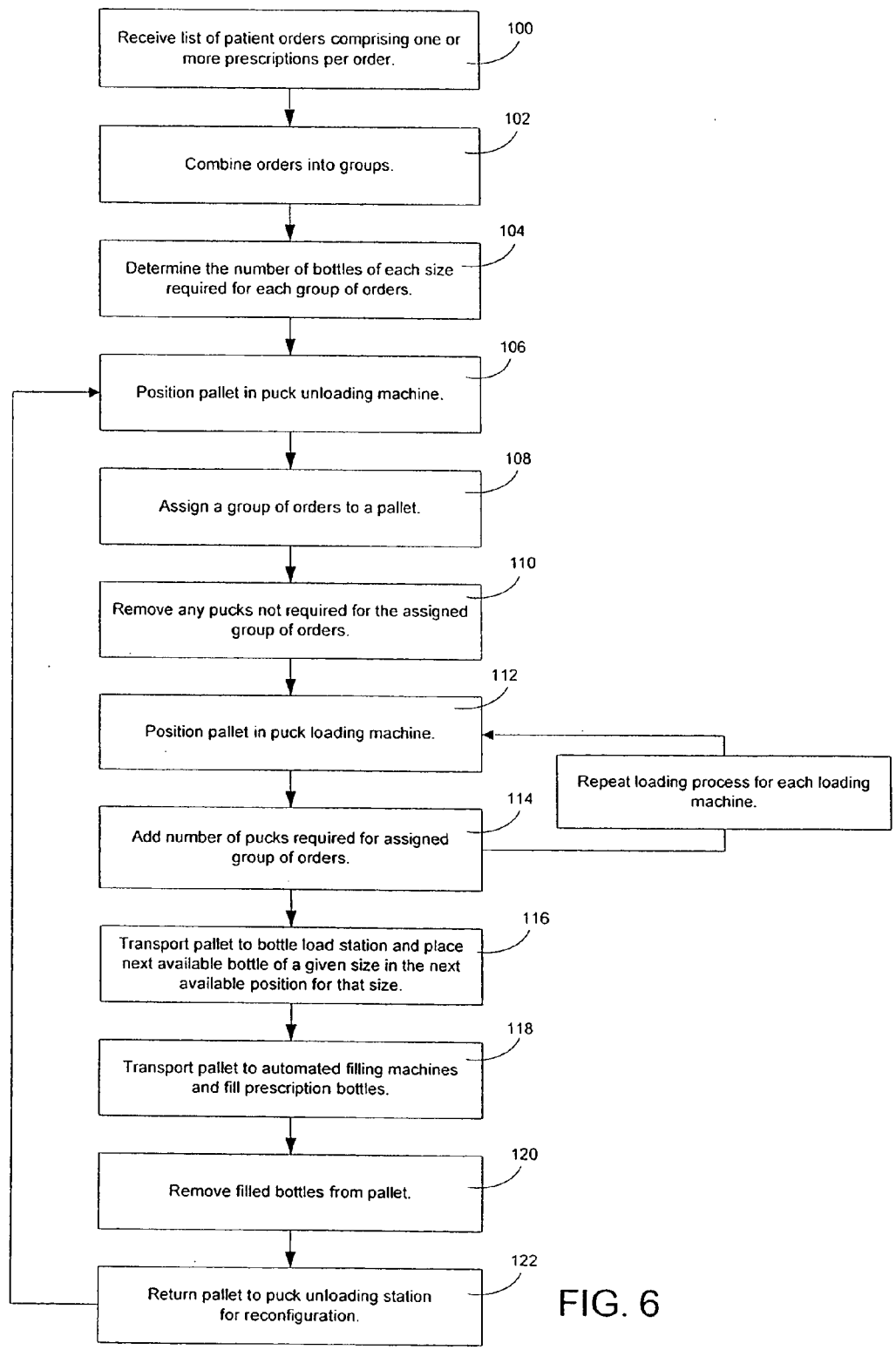
FIG. 6 is a block diagram showing a process for automatically filling prescription orders, where a portion of the orders include bottles of multiple sizes.

FIG. 6 illustrates a process for automatically filling prescription orders, where some of the orders include more than one size of prescription bottle. The process is performed by a carrier system incorporated into an automated prescription dispensing system under the control of a host computer.

The process begins at step 100, where a list of patient orders comprising one or more prescriptions per order is received by the host computer. The list can be organized by any number of order characteristics, for example, the date the order was received. At step 102, the host computer combines the orders into groups. Each group comprises a total number of bottles that is equal to or less than the number of available compartments on the pallet (e.g., 25). Where the filling system includes multiple filling machines, the system software can combine the orders in such a manner as to minimize the number of filling machines required to dispense pills needed to fill the group of orders. Orders which are shipped to a single shipping destination or orders for a single customer can also be grouped together on a single pallet. At step 104, the host computer determines the number of bottles of each size required for each group of orders.

At step 106, a pallet is positioned in a puck unloading machine. A group of orders is assigned to the pallet at step 108. Because pallets are processed cyclically through the system, the pallet received by the unloading machine will ordinarily have pucks loaded on it from the previous group of orders filled using the pallet. At step 110, the puck unloading machine preferably removes any pucks not required for the currently assigned group of orders. Removed pucks can be placed on an accumulation belt for future use.

The pallet is then processed through one or more puck loading machines. As step 112, the pallet is positioned in a puck loading machine. At step 114, the loading machine adds the number of pucks required for the next grouping of orders. Multiple loading machines can be used, each machine handling a different size of puck to accommodate a different bottle size. After exiting the loading machine(s), the pallet is configured with the correct number of pucks for each size of bottle in the group of orders assigned to the pallet. At step 116, the pallet is preferably transported to a bottle loading station where the next available bottle of a given size is placed in the next available compartment adapted for that size. At step 118, the pallet is transported to one or more automated filling machines and the bottles are filled. At step 120, the filled bottles are removed from the pallet. Empty pallets are returned to the puck unloading station at step 122 and the pallet is reconfigured for the next order.

Puck Unloading Station

Figure 7:
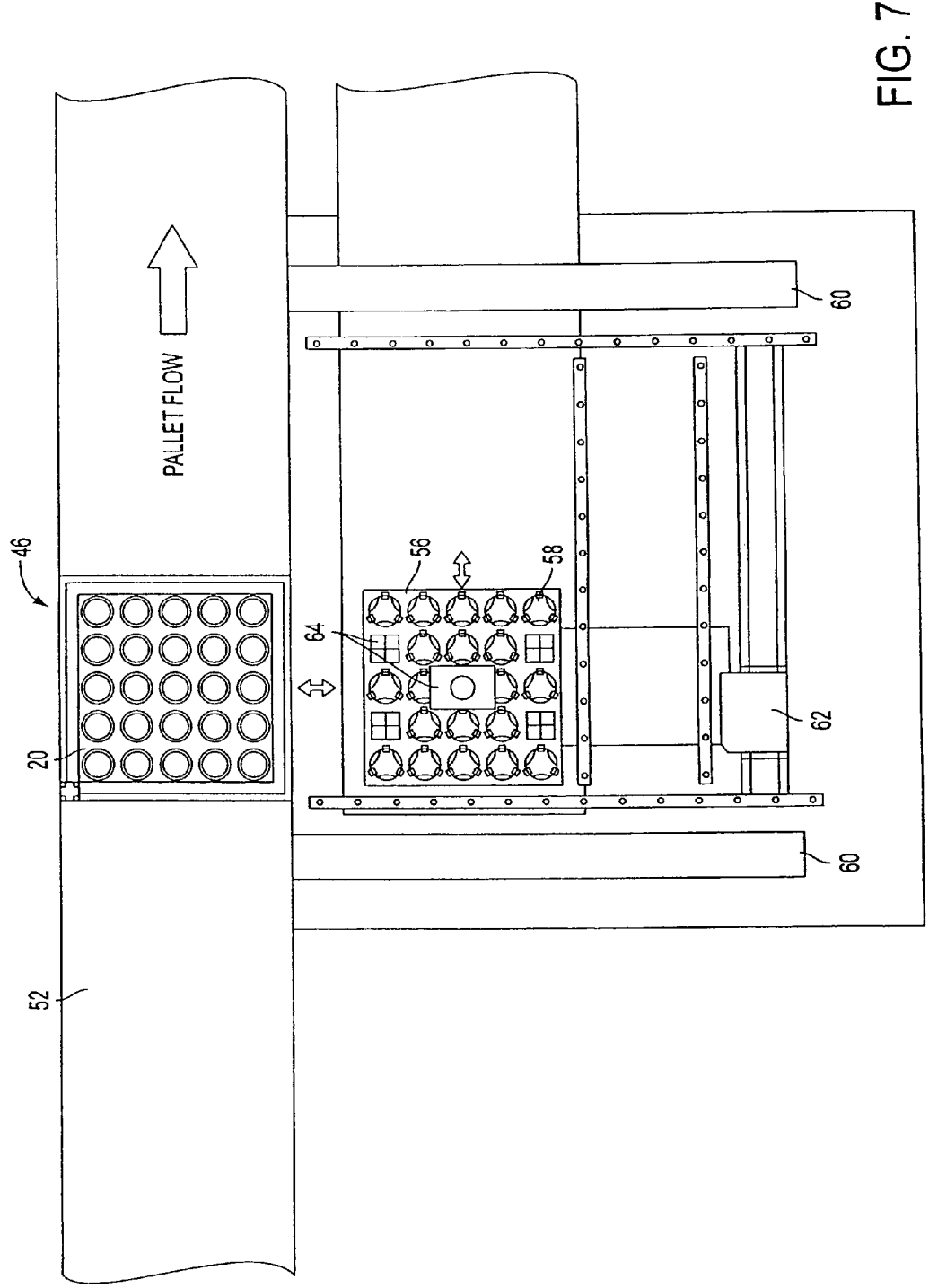
FIG. 7 is a top view of a puck unloading station.
Figure 8:
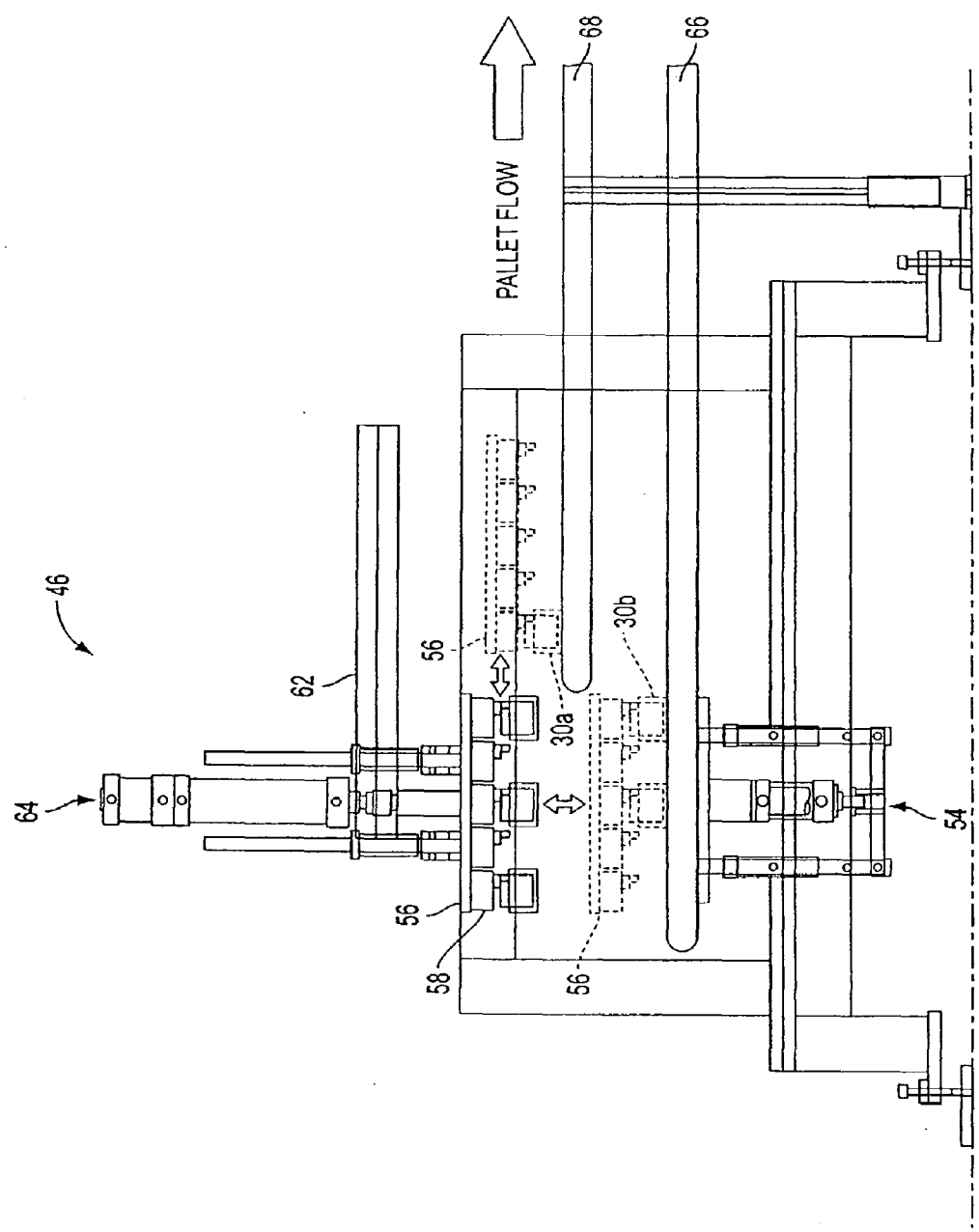
FIG. 8 is a side view of the puck unloading station of FIG. 7.

FIGS. 7 and 8 illustrate a preferred embodiment of a puck unloading station 46. A pallet 20 is transported through the unloading station 46 by conveyor 52. Pallet lift and locate mechanism 54 preferably lifts the pallet from conveyor 52 and precisely positions the pallet for unloading. A puck picker assembly 56 is used to remove pucks from the pallet 20. The puck picker 56 preferably includes twenty-five grippers 58 (corresponding to the twenty-five compartments of the pallet) for selectively gripping and releasing pucks. A set of three linear actuators 60, 62, and 64 move the puck picker 56 to position it to remove pucks from the pallet 20 and release them on one of two accumulator belts 66 and 68, which transport the pucks to the puck loading stations for future use. A pair of x-axis linear actuators 60 move the puck picker 56 along the x-axis to position it over a pallet 20 on the pallet lift and locate mechanism 54. A z-axis linear actuator 64 moves the puck picker 56 up and down so that the grippers 58 can grip and remove the selected pucks from the pallet. The pair of x-axis linear actuators 60 move the puck picker 56 along the x-axis to position the puck picker 56 over a lower 75 cc accumulator belt 66. The z-axis linear actuator 64 lowers the puck picker 56 and the grippers 58 release 75 cc pucks 30*b* onto 75 cc accumulator belt 66. For 120 cc pucks, a y-axis linear actuator 62 and z-axis linear actuator 64 position the puck picker to release the 120 cc pucks 30*a* onto an upper 120 cc accumulator belt 68. As those skilled in the art will appreciate, the invention encompasses and teaches variations of the puck unloading station, including, by way of example, stations without pallet lift mechanisms and variations of quantities and types of grippers, puck pickers and linear actuators.

Figure 9:
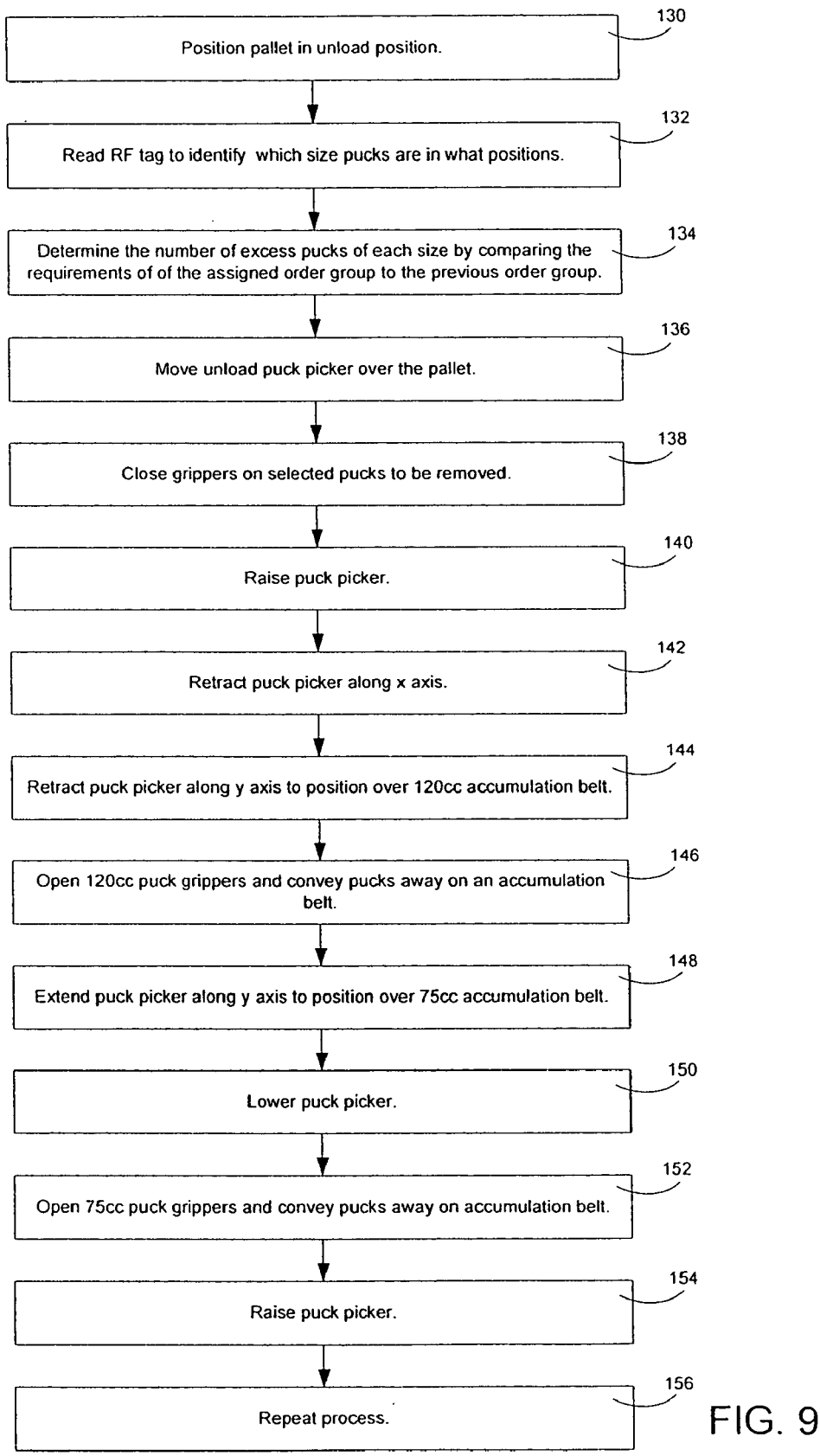
FIG. 9 is a block diagram showing a process performed by a puck unloading station.

FIG. 9 illustrates a preferred process performed by the puck unloading machine shown in FIGS. 7 and 8. The process begins as step 130 where the pallet is positioned in the machine. At step 132, an RF tag on the pallet is read by an RF tag reader to identify the compartments in which pucks are located. This information is stored on the RF tag after pucks are loaded each cycle. At step 134, the host computer determines the number of extra pucks of each size by comparing the requirements of the assigned order group to the puck configuration currently on the pallet from the previous group of orders filled. At step 136, the unload puck picker is moved by actuators in the x, y and z direction to a position over the pallet. At step 138, the grippers of the puck picker close on pucks selected for removal from the pallet. The puck picker is the raised at step 140 by the z-axis actuator. At step 142, the puck picker is retracted along the x-axis by the x-axis actuator. At step 144, the puck picker is retracted along the y-axis by the y-axis actuator to position the puck picker over the 120 cc puck accumulator belt. Selected puck grippers are opened to release 120 cc pucks onto the 120 cc puck accumulation belt at step 146. The puck picker is then extended along the y-axis at step 148 to position it over a 75 cc puck accumulator belt. The puck picker is then lowered at step 150. Selected grippers are opened at step 152 to release the 75 cc pucks onto the 75 cc accumulator belt. The puck picker is then raised by the z-axis actuator at step 154 and the process is repeated until all pucks have been removed as required to achieve the configuration of the group of orders currently assigned to the pallet.

Puck Loading Stations

Figure 10:
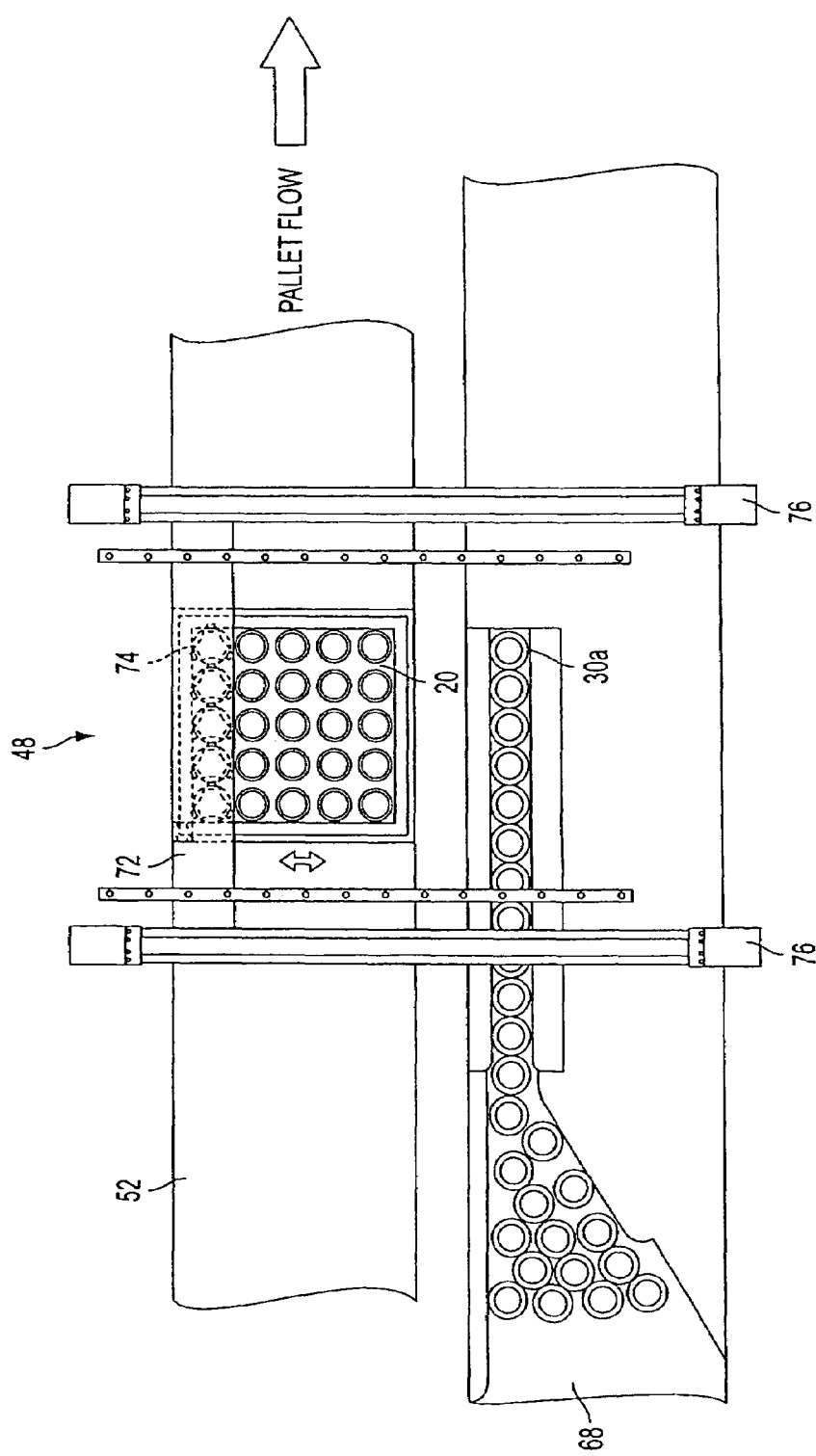
FIG. 10 is a top view of a 120 cc puck loading station.
Figure 11:
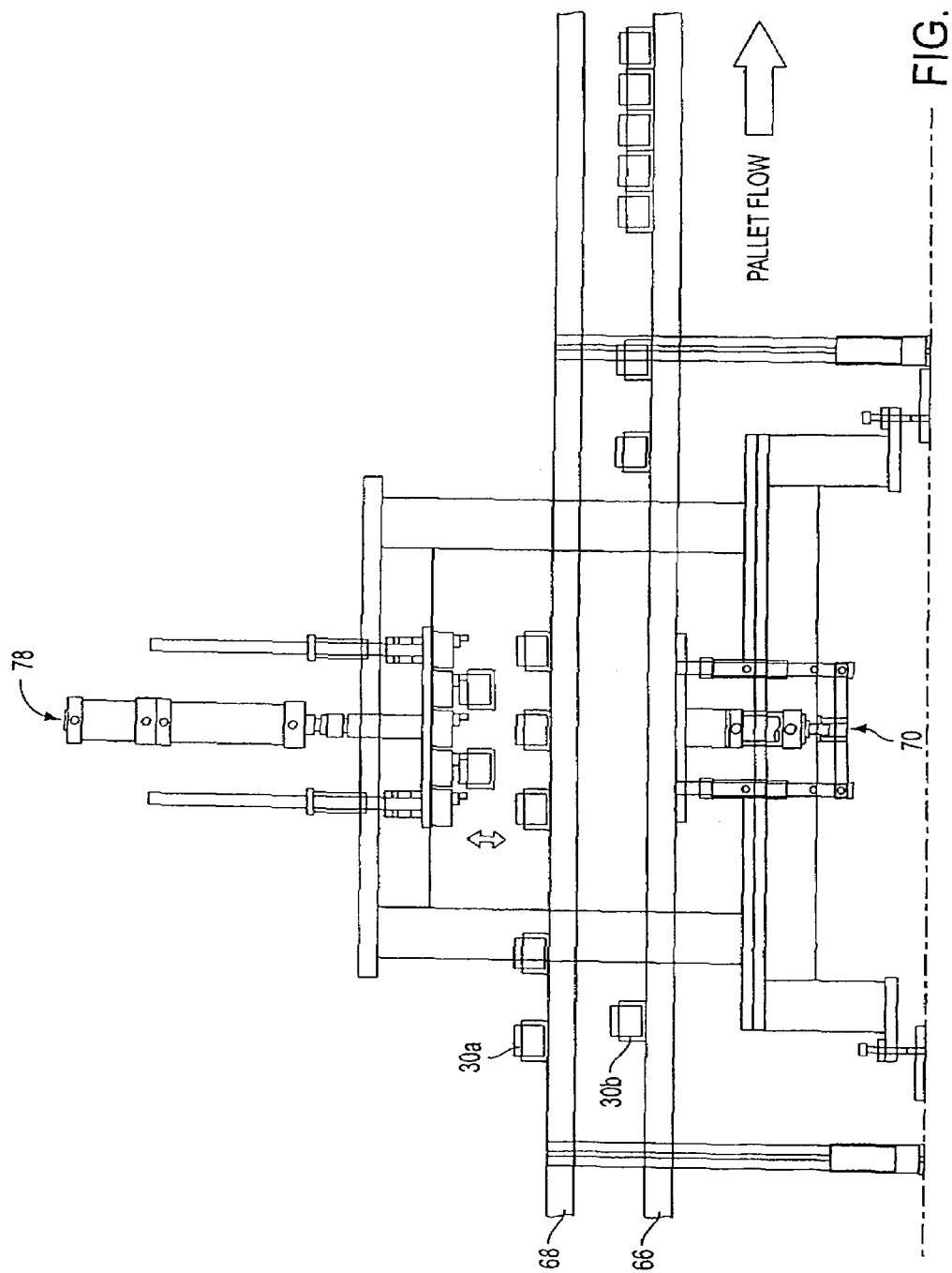
FIG. 11 is a side view of the puck loading station of FIG. 10.

FIGS. 10 and 11 illustrate an embodiment of a 120 cc puck loading station 48. A pallet 20 is transported through the loading station 48 by conveyor 52. Pallet lift and locate mechanism 70 preferably lifts the pallet 20 from conveyor 52 and precisely positions the pallet for loading. A puck picker assembly 72 is used to load pucks onto the pallet 20. The puck picker assembly 72 includes five grippers 74 for selectively gripping and releasing pucks 30a. Though five grippers are used in the illustrated embodiment, the number of grippers can be varied to efficiently load the number of pucks of the particular size typically required. Upper puck accumulator belt 68 delivers pucks from the puck unload station 46 to the 120 cc puck loading station 48. Linear actuators 76 and 78 move the puck picker 72 to position it to remove pucks from the accumulator belt 68 and selectively load them on the pallet 20. A pair of x-axis linear actuators 76 move the puck picker 72 along the x-axis to position it over the single line of pucks on accumulator belt 68. A z-axis linear actuator 78 moves the puck picker 72 up and down so that the grippers 74 can grip and remove a selected number of pucks from the accumulator belt 68. The pair of x-axis linear actuators 76 move the puck picker 72 along the x-axis to position the puck picker 72 over pallet 20 on lift and locate mechanism 70. The z-axis linear actuator 78 lowers the puck picker 72 and the grippers 74 release 120 cc pucks 30a into selected containers 26 of pallet 20. This process is repeated as necessary to load pallet 20 with a desired number of 120 cc pucks 30a.

Figure 12:
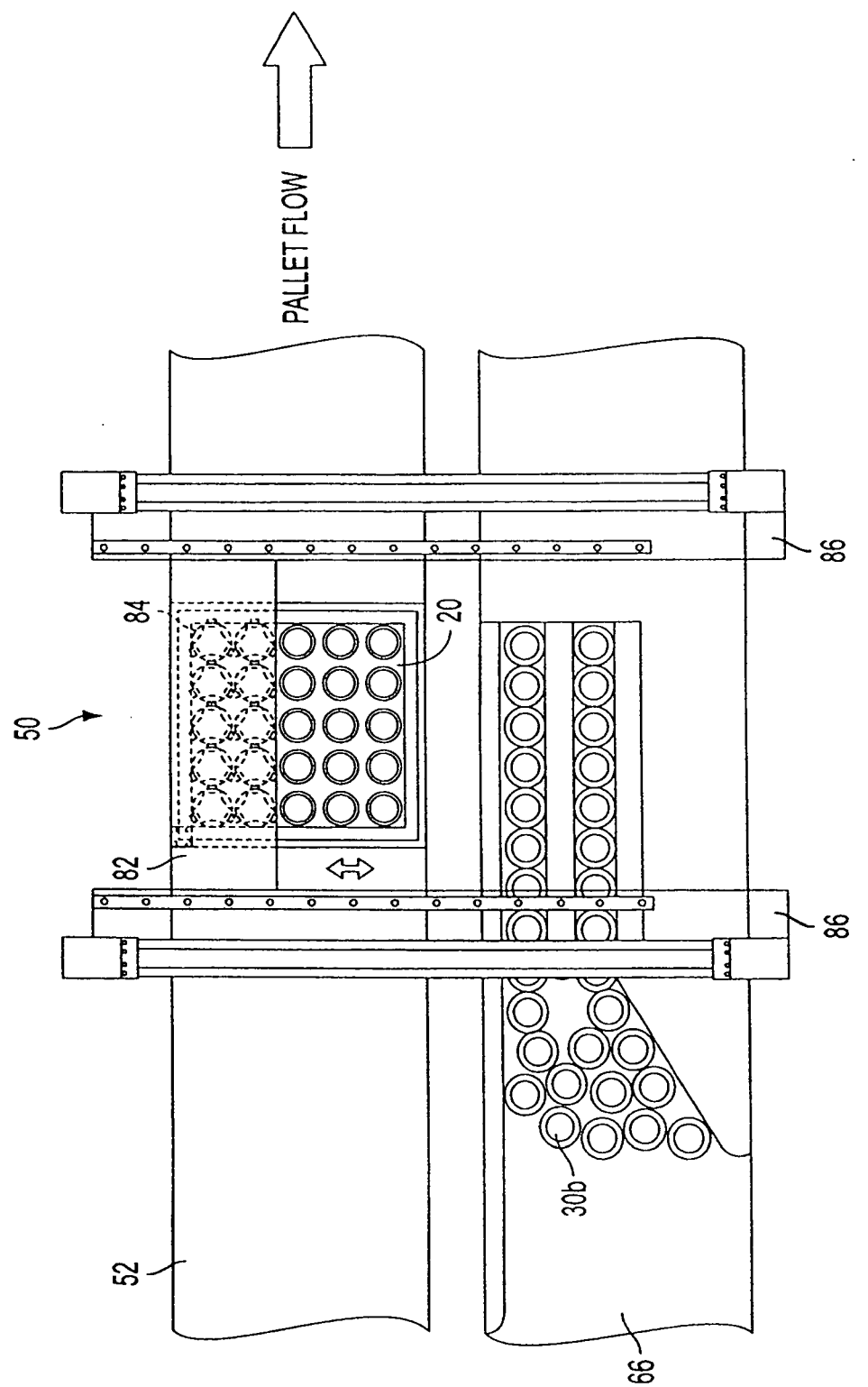
FIG. 12 is a top view of a 75 cc puck loading station.
Figure 13:
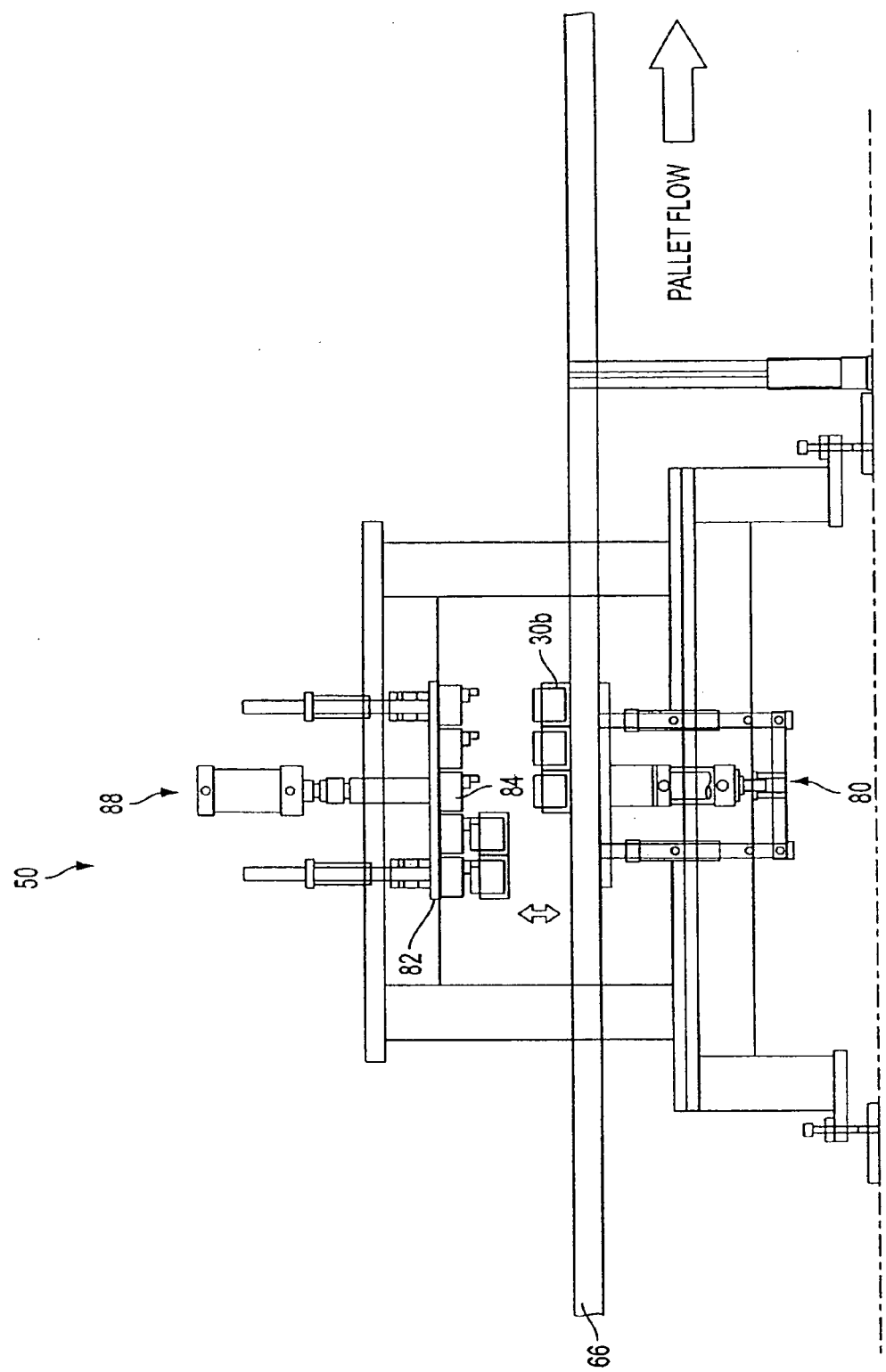
FIG. 13 is a side view of the puck loading station of FIG. 12.

The operation of the illustrated embodiment of the 75 cc puck loading station 50 is similar to that of 120 cc puck loading station 48. FIGS. 12 and 13 illustrate an embodiment of the 75 cc puck loading station 50. A pallet 20 is transported through the loading station 50 by conveyor 52. A pallet lift and locate mechanism 80 can be used to lift the pallet 20 from conveyor 52 and precisely positions the pallet for loading. A puck picker assembly 82 is used to load pucks onto the pallet 20. The puck picker assembly 82 includes ten grippers 84 for selectively gripping and releasing pucks 30b. Puck accumulator belt 66 delivers pucks from the puck unload station 48 to the 75 cc puck loading station 50. Linear actuators 86 and 88 move the puck picker 82 to position it to remove pucks from the accumulator belt 66 and selectively load them on the pallet 20. A pair of x-axis linear actuators 86 move the puck picker 82 along the x-axis to position it over the double line of pucks on accumulator belt 66. A z-axis linear actuator 88 moves the puck picker 82 up and down so that the grippers 84 can grip and remove a selected number of pucks from the accumulator belt 66. The pair of x-axis linear actuators 86 move the puck picker 82 along the x-axis to position the puck picker 82 over pallet 20 on lift and locate mechanism 80. The z-axis linear actuator 88 lowers the puck picker 82 and the grippers 84 release 75 cc pucks 30b into containers 26 of pallet 20. This process is repeated as necessary to load pallet 20 with a desired number of 75 cc pucks 30b. Upon loading of the desired number of 120 cc and 75 cc pucks, the pallet is placed in the desired configuration for filling and is transported by conveyor 52 through an automated filling process as shown in FIG. 1.

Figure 14:
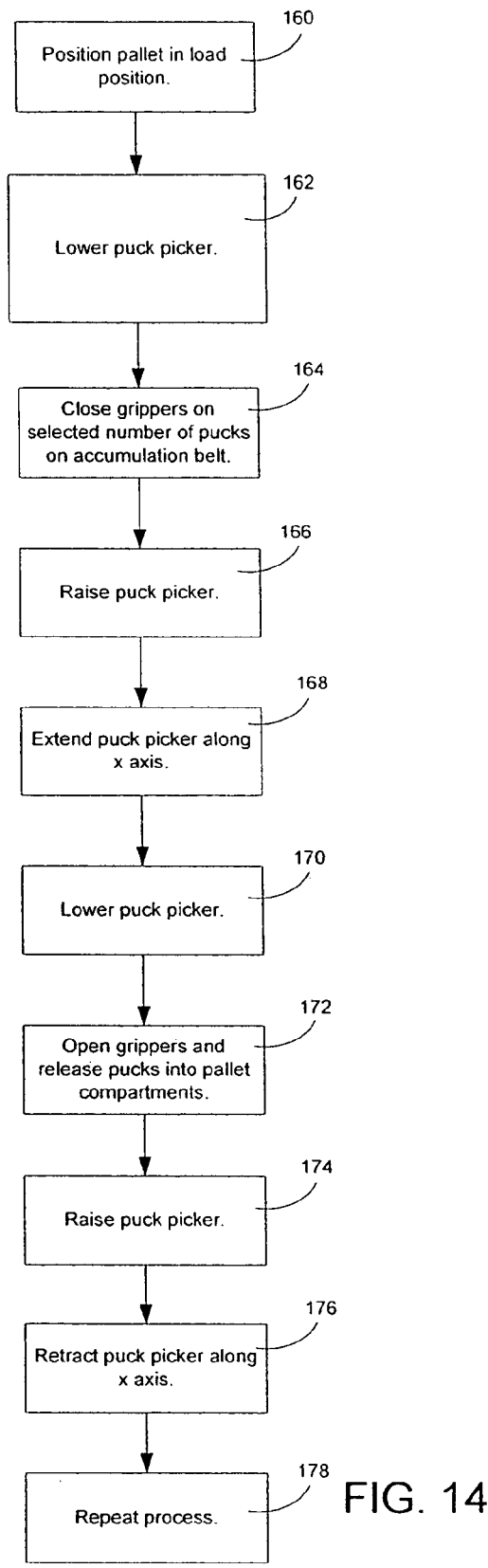
FIG. 14 is a block diagram showing a process performed by a puck loading station.

FIG. 14 illustrates the process performed by the preferred embodiment of the puck loading machines described above. At step 160 the pallet is positioned in the load position of the loading machine. At step 162, the puck picker is lowered by a z-axis actuator over one or more rows of pucks on an accumulator belt. At step 164, the grippers close on the desired number of pucks to be loaded. The number of pucks gripped is determined by the requirements of the group of orders assigned to the pallet. At step 166, the puck picker is raised by the z-axis actuator. At step 168, the puck picker is extended along the x axis by the x-axis actuator to position the puck picker over the pallet. At step 170, the z-axis actuator lowers the puck picker. At step 172, the grippers open to insert the pucks into selected compartments of the pallet. At step 174, the puck picker is raised. At step 176, the puck picker is retracted along the x axis.

Although the invention has been described with reference to a specific prescription dispensing embodiment, as will be understood by those skilled in the art, other embodiments and variations may be made without departing from the spirit or scope of the invention. For instance, the system and method is not limited to prescription bottles and can be used in any automated process for filling containers of various sizes and shapes with various contents. Accordingly, the example described herein is intended to be illustrative of the invention and are not intended to be limiting. The scope of the invention is defined as set forth in the appended claims.

We claim:

1. A bottle carrier system for use in an automated process for filling prescription bottles of a plurality of sizes, the system comprising:
   a. a plurality of bottle pallets, each pallet comprising a structure defining a plurality of compartments for holding bottles, each compartment of a size adapted to hold a first bottle size;
   b. a plurality of pucks, each puck structured to be temporarily inserted into a compartment to adapt the compartment to hold a second bottle size;
   c. a puck configuration subsystem for configuring each pallet to hold a desired combination of bottles of the first and second bottle size by inserting and removing pucks from the compartments, the puck configuration subsystem comprising:
      i. a puck unloading station for unloading pucks from each pallet, the puck unloading station comprising:
         1. a puck picker comprising one or more grippers for selectively gripping and releasing pucks;
         2. a puck accumulator belt for accumulating pucks; and
         3. a plurality of linear actuators for positioning the puck picker such that the puck picker can remove a selected number of pucks from each pallet and release the selected pucks onto the accumulator belt;
      ii. a puck loading station for receiving pallets from the unloading station and loading pucks on each pallet, the loading station comprising:
         1. a puck picker comprising one or more grippers for selectively gripping and releasing pucks; and
         2. a plurality of linear actuators for positioning the puck picker such that the puck picker can remove a selected number of pucks from the accumulator belt and release the pucks into compartments of the pallet; and d. a pallet conveyor for transporting pallets through the puck configuration subsystem and transporting configured pallets from the puck configuration subsystem to the filling process and returning empty pallets from the filling process to the puck configuration subsystem for reconfiguration.

2. A bottle carrier system for use in an automated process for filling prescription bottles of a plurality of sizes, the system comprising:
   a. a plurality of bottle pallets, each pallet comprising a structure defining a plurality of compartments for holding bottles, each compartment of a size adapted to hold a first bottle size;
   b. a first plurality of pucks of a first size, each puck of the first plurality of pucks structured to be temporarily inserted into a compartment to adapt the compartment to hold a second bottle size;
   c. a second plurality of pucks of a second size, each puck of the second plurality of pucks structured to be temporarily inserted into a compartment to adapt the compartment to hold a third bottle size;
   d. a puck configuration subsystem for configuring each pallet to hold a desired combination of containers of the first, second and third container size, by inserting or removing pucks from the compartments of each pallet, the puck configuration subsystem comprising:
      i. a puck unloading station for unloading pucks from each pallet, the puck unloading station comprising:
         1. a puck picker comprising one or more grippers for selectively gripping and releasing pucks;
         2. a first puck accumulator belt for accumulating pucks of the first size;
         3. a second puck accumulator belt for accumulating pucks of the second size; and
         4. a plurality of linear actuators for positioning the puck picker such that the puck picker can remove a selected number of pucks of the first size from the pallet and release the selected pucks of the first size onto the first accumulator belt and remove a selected number of pucks of the second size from the pallet and release the selected pucks of the second size onto the second accumulator belt;
      ii. a first puck loading station for receiving pallets from the unloading station and loading pucks of the first size on each pallet, the first loading station comprising:
         1. a puck picker comprising one or more grippers for selectively gripping and releasing pucks; and
         2. a plurality of linear actuators for positioning the puck picker such that the puck picker can remove selected pucks of the first size from the first accumulator belt and load the selected pucks of the first size into compartments of the pallet; and
      iii. a second puck loading station for receiving pallets from the first loading station and loading pucks of the second size on each pallet, the second loading station comprising:
         1. a puck picker comprising one or more grippers for selectively gripping and releasing pucks; and
         2. a plurality of linear actuators for positioning the puck picker such that the puck picker can remove selected pucks of the second size from the second accumulator belt and load the selected pucks of the second size into compartments of the pallet; and
   e. a pallet conveyor for transporting pallets through the puck configuration subsystem and transporting configured pallets from the puck configuration subsystem to the filling process and returning empty pallets from the filling process to the puck configuration subsystem for reconfiguration.

3. A container carrier system for use in an automated process for filling containers of a plurality of sizes, the system comprising:
   a. a plurality of pallets, each pallet comprising a structure defining a plurality of compartments for holding containers, each compartment of a size adapted to hold a first container size;
   b. a plurality of pucks, each puck configured to be temporarily inserted into a compartment to adapt the compartment to hold a second container size;
   c. a puck configuration subsystem for configuring each pallet to hold a desired combination of containers comprising the first container size and second container size by inserting or removing pucks from the compartments, the puck configuration subsystem comprising:
      i. a puck unloading station for unloading pucks from each pallet, the puck unloading station comprising:
         1. a puck picker comprising one or more grippers for selectively gripping and releasing pucks;
         2. a puck accumulator belt for accumulating pucks; and
         3. a plurality of linear actuators for positioning the puck picker such that the puck picker can remove a selected number of pucks from the pallet and release the selected pucks onto the puck accumulator belt; and
      ii. a puck loading station for loading pucks on each pallet; and
   d. a pallet conveyor for transporting configured pallets from the puck configuration subsystem to the filling process and returning empty pallets from the filling process to the puck configuration subsystem for reconfiguration.

4. A container carrier system for use in an automated process for filling containers of a plurality of sizes, the system comprising:
   a. a plurality of pallets, each pallet comprising a structure defining a plurality of compartments for holding containers, each compartment of a size adapted to hold a first container size;
   b. a plurality of pucks, each puck configured to be temporarily inserted into a compartment to adapt the compartment to hold a second container size;
   c. a puck configuration subsystem for configuring each pallet to hold a desired combination of containers comprising the first container size and second container size by inserting or removing pucks from the compartments, the puck configuration subsystem comprising:
      i. a puck unloading station for unloading pucks from each pallet; and
      ii. a puck loading station for loading pucks on each pallet, the puck loading station comprising:
         1. a puck picker comprising one or more grippers for selectively gripping and releasing pucks;
         2. a puck accumulator belt for accumulating pucks; and
         3. a plurality of linear actuators for positioning the puck picker, such that the puck picker can remove a selected number of pucks from the accumulator belt and load the selected pucks on the pallet; and
   d. a pallet conveyor for transporting configured pallets from the puck configuration subsystem to the filling process and returning empty pallets from the filling process to the puck configuration subsystem for reconfiguration.

5. A container carrier system for use in an automated process for filling containers of a plurality of sizes, the carrier system comprising:

f. a pallet comprising a base and a superstructure defining a plurality of compartments of a cuplike shape, each compartment having a bottom adjoining the base, tubular side walls and a top defining an opening for receiving a puck or a cylindrical container of a first size; and g. a plurality of pucks, each puck structured to be removeably and automatically loaded onto the pallet to adapt a compartment to hold a second container size and at least one of the pucks being removeably held by one of the compartments to adapt that compartment to hold the second container size, wherein the pucks are of a cuplike shape having a top, tubular outer side walls, tubular inner side walls, and a bottom, the inner side walls defining a tubular opening for receiving a container, and the inner and outer side walls defining a tubular slot between the inner and outer side walls at the bottom for receiving the tubular side walls of a compartment;

whereby the pallet can be repetitively and automatically configured to hold various desired combinations of containers of the first size and the second size at the same time by loading and unloading pucks from the pallet.

* * * * *